M. SKOLNIK.
PROCESS OF MAKING HUBS.
APPLICATION FILED MAR. 8, 1920.

1,385,231.

Patented July 19, 1921.

INVENTOR:
MAX SKOLNIK.
By Whiteley and Ruckman
ATTORNEYS.

UNITED STATES PATENT OFFICE.

MAX SKOLNIK, OF MINNEAPOLIS, MINNESOTA.

PROCESS OF MAKING HUBS.

1,385,231. Specification of Letters Patent. Patented July 19, 1921.

Application filed March 8, 1920. Serial No. 364,286.

*To all whom it may concern:*

Be it known that I, MAX SKOLNIK, a citizen of the United States, residing at Minneapolis, in the county of Hennepin and State of Minnesota, have invented certain new and useful Improvements in Processes of Making Hubs, of which the following is a specification.

My invention relates to the process of making hubs. An object is to provide a strong and durable hub having parts which may be secured together in such manner that the hub may be economically and expeditiously manufactured.

The full objects and advantages of my invention will appear in connection with the detailed description thereof and the novel features embodied in my inventive idea will be particularly pointed out in the claims.

Figure 1:
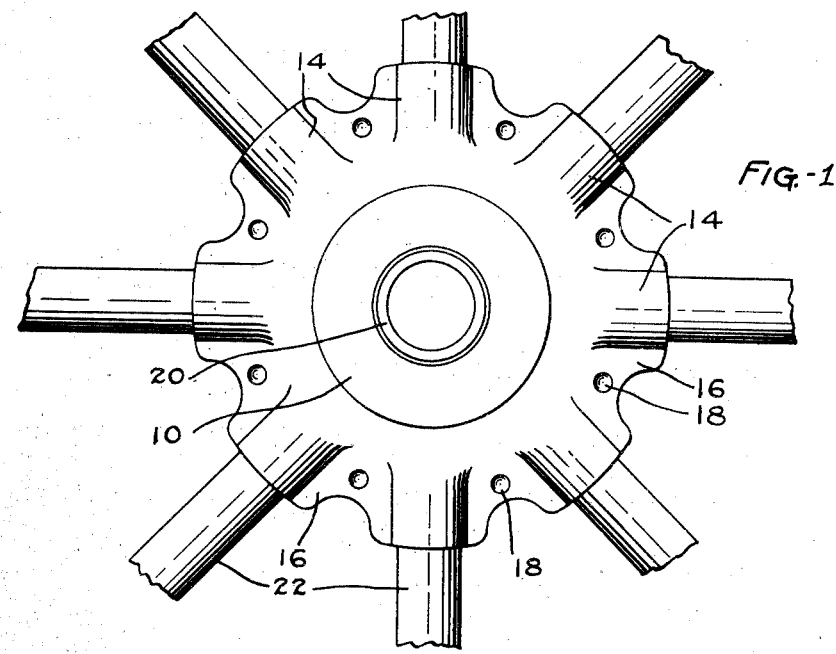
Figure 2:
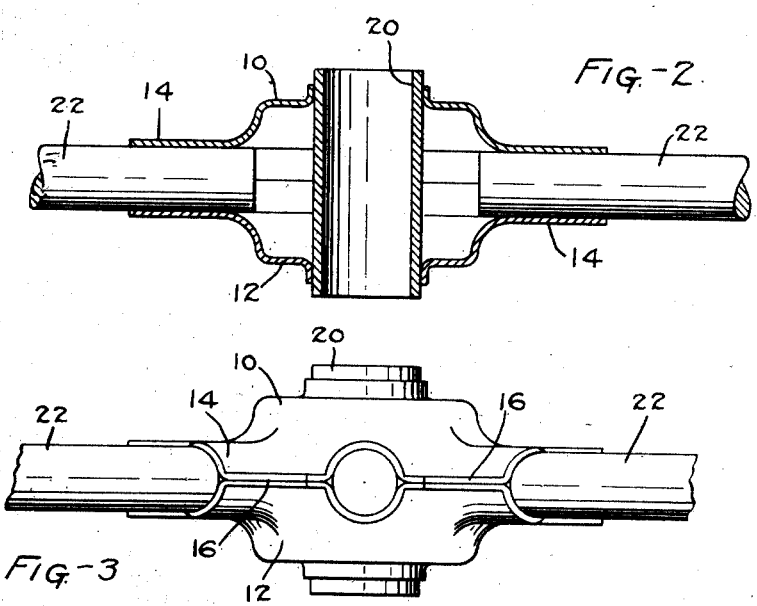
Figure 3:
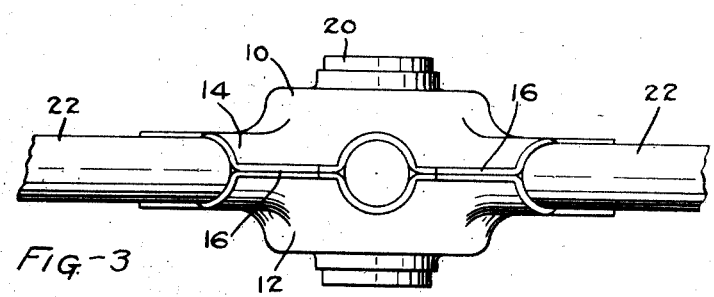

In the accompanying drawings Figure 1 is a side elevational view of the hub showing the inner ends of the spokes secured thereto. Fig. 2 is a view in central section. Fig. 3 is a top plan view.

Referring to the drawings the numerals 10 and 12 designate two complemental hub members which are stamped or otherwise formed from sheet metal into such shape that socket portions 14 and contacting portions 16 occur alternately when the two complemental members are placed together. The contacting portions 16 are secured together in suitable manner, preferably by spot welding, as indicated at 18. In order to complete the hub the combined members 10 and 12 are heated and a sleeve 20 is inserted into the open center of the hub. This sleeve is of such size as to fit within the open center when the hub members 10 and 12 are hot, but when these members cool and shrink they securely hold the sleeve and the latter in turn aids in holding the two hub members together. The socket portions 14 serve to receive the inner ends of spokes 22.

The operation and advantages of my invention will be apparent from the foregoing description. The complemental hub members may be economically and expeditiously stamped from sheet metal to produce the socket portions and the contacting portions and the latter may be readily secured together. Upon securing the sleeve within the open center of united hub members the hub is not only greatly strengthened but a smooth bearing for receiving a shaft or axle is produced.

I claim:

1. The process of making hubs consisting in shaping complemental hub members so that when placed together socket portions and contacting portions occur alternately, then securing together said contacting portions, and shrinking said hub members upon a sleeve.

2. The process of making hubs consisting in stamping complemental hub members from sheet metal so that when placed together socket portions and contacting portions occur alternately, then spot welding said contacting portions and shrinking said hub members upon a sleeve.

In testimony whereof I hereunto affix my signature.

MAX SKOLNIK.